(12) United States Patent
Wilson et al.

(10) Patent No.: US 12,446,637 B2
(45) Date of Patent: *Oct. 21, 2025

(54) LOW HAZE UV BLOCKING REMOVABLE LENS STACK

(71) Applicant: Laminated Film LLC, Las Vegas, NV (US)

(72) Inventors: Stephen S. Wilson, Las Vegas, NV (US); Bart E. Wilson, Las Vegas, NV (US)

(73) Assignee: LAMINATED FILM LLC, Las Vegas, NV (US)

( * ) Notice: Subject to any disclaimer, the term of this patent is extended or adjusted under 35 U.S.C. 154(b) by 157 days.

This patent is subject to a terminal disclaimer.

(21) Appl. No.: 18/338,215

(22) Filed: Jun. 20, 2023

(65) Prior Publication Data

US 2023/0329372 A1 Oct. 19, 2023

Related U.S. Application Data

(63) Continuation of application No. 17/938,308, filed on Oct. 5, 2022, now Pat. No. 11,723,420, which is a
(Continued)

(51) Int. Cl.
*A41D 13/11* (2006.01)
*G02B 1/04* (2006.01)
(Continued)

(52) U.S. Cl.
CPC .......... *A41D 13/1184* (2013.01); *G02B 1/041* (2013.01); *G02B 1/14* (2015.01); *G02B 5/208* (2013.01)

(58) Field of Classification Search
CPC ................ A41D 13/1184; A41D 13/11; A41D 2400/26; G02B 1/14; G02B 1/041;
(Continued)

(56) References Cited

U.S. PATENT DOCUMENTS

| 1,337,036 A | 4/1920 | Bergmann |
| 1,366,907 A | 2/1921 | Dunand |

(Continued)

FOREIGN PATENT DOCUMENTS

| AU | 2005244595 A1 | 7/2006 |
| AU | 2015277196 A1 | 1/2017 |

(Continued)

OTHER PUBLICATIONS

*Racing Optics, Inc. v. Aevoe Corp. DBA Moshi*; Case 2:15-cv-01774-RCJ-VCF; "Answer to Aevoe's Counterclaims—Jury Trial Demanded"; Nov. 2, 2015; 15 pages.

(Continued)

*Primary Examiner* — Stephone B Allen
*Assistant Examiner* — Adam W Booher
(74) *Attorney, Agent, or Firm* — Stetina Garred Brucker & Newboles

(57) ABSTRACT

A protective lens stack comprises a base layer including a polyethylene terephthalate (PET) film containing a UV blocking additive and one or more removable lens layers stacked on top of the base layer. Each of the removable lens layers may include a PET film and a first adhesive disposed on a bottom surface of the PET film. Refractive indices of the base layer and the one or more removable lens layers may be matched to within 0.2. Each layer of the protective lens stack, including the base layer and each of the removable lens layer(s), may have less than 0.5% haze. The protective lens stack may be used as a face shield or may be surface mountable using a second adhesive disposed on a bottom surface of the PET film containing the UV blocking additive.

13 Claims, 1 Drawing Sheet

Related U.S. Application Data continuation of application No. 17/342,373, filed on Jun. 8, 2021, now Pat. No. 11,490,667.

(51) Int. Cl.
  *G02B 1/14* (2015.01)
  *G02B 5/20* (2006.01)

(58) Field of Classification Search
  CPC . G02B 1/04; G02B 1/18; G02B 5/208; G02B 5/20; G02B 5/22; G02B 5/223; G02B 5/1885; G02B 3/0062; G02B 3/0068; G02B 17/002; G02B 30/27; B32B 2307/40; B32B 2307/412; B32B 2307/71; B32B 27/36
  See application file for complete search history.

(56) References Cited

U.S. PATENT DOCUMENTS

| | | |
|---|---|---|
| 2,138,086 A | 11/1938 | Blodjer |
| 2,248,331 A | 7/1941 | Blodjer |
| 2,328,687 A | 9/1943 | Serr |
| 2,339,280 A | 1/1944 | Harold |
| 2,354,415 A | 7/1944 | Woodard |
| 2,461,604 A | 2/1949 | Huntsman |
| 2,511,329 A | 6/1950 | Craig |
| 2,546,117 A | 3/1951 | Whelan |
| 2,563,125 A | 8/1951 | Malcom, Jr. |
| 2,569,715 A | 10/1951 | Green |
| 2,640,068 A | 5/1953 | Schaefer et al. |
| 2,736,109 A | 2/1956 | Scholl |
| 2,923,944 A | 2/1960 | Lindblom |
| 2,963,708 A | 12/1960 | Herbine et al. |
| 3,095,575 A | 7/1963 | Radov |
| 3,298,031 A | 1/1967 | Harold |
| 3,475,766 A | 11/1969 | Raschke |
| 3,577,565 A | 5/1971 | Feldmann et al. |
| 3,605,115 A | 9/1971 | Bohner |
| 3,685,054 A | 8/1972 | Raschke |
| 3,774,239 A | 11/1973 | Kotzar |
| 3,785,102 A | 1/1974 | Amos |
| 3,797,042 A | 3/1974 | Gager |
| 3,810,815 A | 5/1974 | Welhart et al. |
| 3,868,293 A | 2/1975 | Selph |
| 3,937,863 A | 2/1976 | Moore |
| 3,948,662 A | 4/1976 | Alston et al. |
| 3,950,580 A | 4/1976 | Boudet |
| 3,987,569 A | 10/1976 | Chase |
| 4,063,740 A | 12/1977 | Mader |
| 4,076,373 A | 2/1978 | Moretti |
| 4,090,464 A | 5/1978 | Bishopp et al. |
| D249,597 S | 9/1978 | Dillon |
| 4,138,746 A | 2/1979 | Bergmann |
| D254,638 S | 4/1980 | Bay, Jr. |
| 4,204,231 A | 5/1980 | Permenter |
| 4,248,762 A | 2/1981 | Hornibrook et al. |
| 4,248,918 A | 2/1981 | Hornibrook et al. |
| 4,268,134 A | 5/1981 | Gulati et al. |
| 4,273,098 A | 6/1981 | Silverstein |
| 4,301,193 A | 11/1981 | Zuk |
| 4,332,861 A | 6/1982 | Franz et al. |
| 4,333,983 A | 6/1982 | Allen |
| 4,380,563 A | 4/1983 | Ayotte |
| 4,528,701 A | 7/1985 | Smith |
| 4,557,980 A | 12/1985 | William |
| 4,582,764 A | 4/1986 | Allerd et al. |
| 4,625,341 A | 12/1986 | Broersma |
| 4,658,515 A | 4/1987 | Oatman |
| 4,696,860 A | 9/1987 | Epperson |
| 4,701,965 A | 10/1987 | Landis |
| 4,716,601 A | 1/1988 | Mcneal |
| 4,726,074 A | 2/1988 | Baclit et al. |
| 4,729,179 A | 3/1988 | Quist, Jr. |
| 4,769,265 A | 9/1988 | Coburn, Jr. |
| D299,767 S | 2/1989 | Hsin |
| 4,842,919 A | 6/1989 | David et al. |
| 4,850,049 A | 7/1989 | Landis et al. |
| 4,852,185 A | 8/1989 | Olson |
| 4,852,186 A | 8/1989 | Landis |
| 4,853,974 A | 8/1989 | Olim |
| 4,856,535 A | 8/1989 | Forbes |
| 4,864,653 A | 9/1989 | Landis |
| 4,867,178 A | 9/1989 | Smith |
| 4,884,296 A | 12/1989 | Nix, Jr. |
| 4,884,302 A | 12/1989 | Foehl |
| 4,889,754 A | 12/1989 | Vargas |
| D306,363 S | 2/1990 | Stackhouse et al. |
| 4,907,090 A | 3/1990 | Ananian |
| 4,911,964 A | 3/1990 | Corbo |
| D307,065 S | 4/1990 | Friedman |
| 4,920,576 A | 5/1990 | Landis |
| 4,934,792 A | 6/1990 | Tovi |
| 4,945,573 A | 8/1990 | Landis |
| 4,950,445 A | 8/1990 | Salce et al. |
| D311,263 S | 10/1990 | Russell |
| 4,964,171 A | 10/1990 | Landis |
| 4,965,887 A | 10/1990 | Paoluccio et al. |
| 4,973,511 A | 11/1990 | Farmer et al. |
| 4,975,981 A | 12/1990 | Ray |
| 5,000,528 A | 3/1991 | Kawakatsu |
| 5,002,326 A | 3/1991 | Spicer et al. |
| D318,147 S | 7/1991 | Russell |
| 5,035,004 A | 7/1991 | Koester |
| D319,449 S | 8/1991 | Millar |
| 5,046,195 A | 9/1991 | Koritan |
| D321,268 S | 10/1991 | Nix, Jr. |
| 5,052,054 A | 10/1991 | Birum |
| 5,054,480 A | 10/1991 | Bare et al. |
| 5,067,475 A | 11/1991 | Posnansky |
| 5,071,206 A | 12/1991 | Hood et al. |
| H1023 H | 3/1992 | Wiseman |
| 5,104,929 A | 4/1992 | Bilkadi |
| 5,113,528 A | 5/1992 | Burke, Jr. et al. |
| D331,820 S | 12/1992 | Scanlon |
| D333,366 S | 2/1993 | Brown |
| 5,183,700 A | 2/1993 | Austin |
| 5,194,293 A | 3/1993 | Foster |
| 5,201,077 A | 4/1993 | Dondlinger |
| 5,206,956 A | 5/1993 | Olson |
| 5,208,916 A | 5/1993 | Kelman |
| 5,239,406 A | 8/1993 | Lynam |
| 5,318,685 A | 6/1994 | O'Shaughnessy |
| D349,177 S | 7/1994 | Russell |
| D349,178 S | 7/1994 | Russell |
| 5,327,180 A | 7/1994 | Hester, III et al. |
| D349,362 S | 8/1994 | Russell |
| 5,364,671 A | 11/1994 | Gustafson |
| 5,365,615 A | 11/1994 | Piszkin |
| D353,691 S | 12/1994 | Scanlon |
| D354,588 S | 1/1995 | Russell |
| D354,589 S | 1/1995 | Russell |
| 5,420,649 A | 5/1995 | Lewis |
| D359,586 S | 6/1995 | Lofton |
| D361,160 S | 8/1995 | Russell |
| 5,443,877 A | 8/1995 | Kramer et al. |
| D362,086 S | 9/1995 | Russell |
| 5,468,247 A | 11/1995 | Matthai et al. |
| 5,471,036 A | 11/1995 | Sperbeck |
| 5,473,778 A | 12/1995 | Bell |
| 5,486,883 A | 1/1996 | Candido |
| 5,507,332 A | 4/1996 | McKinnon |
| 5,510,173 A | 4/1996 | Pass et al. |
| 5,512,116 A | 4/1996 | Campfield |
| 5,523,132 A | 6/1996 | Zhang et al. |
| RE35,318 E | 8/1996 | Warman |
| 5,544,361 A | 8/1996 | Fine et al. |
| 5,553,608 A | 9/1996 | Reese et al. |
| 5,555,570 A | 9/1996 | Bay |
| 5,557,683 A | 9/1996 | Eubanks |
| 5,584,130 A | 12/1996 | Perron |
| 5,592,698 A | 1/1997 | Woods |
| 5,593,786 A | 1/1997 | Parker et al. |
| 5,622,580 A | 4/1997 | Mannheim |

(56) References Cited

U.S. PATENT DOCUMENTS

| | | |
|---|---|---|
| 5,633,049 A | 5/1997 | Bilkadi et al. |
| 5,668,612 A | 9/1997 | Hung |
| 5,671,483 A | 9/1997 | Reuber |
| 5,673,431 A | 10/1997 | Batty |
| 5,687,420 A | 11/1997 | Chong |
| 5,694,650 A | 12/1997 | Hong |
| 5,702,415 A | 12/1997 | Matthai et al. |
| 5,709,825 A | 1/1998 | Shih |
| 5,740,560 A | 4/1998 | Muoio |
| 5,792,535 A | 8/1998 | Weder |
| 5,806,102 A | 9/1998 | Park |
| 5,815,848 A | 10/1998 | Jarvis |
| 5,819,311 A | 10/1998 | Lo |
| 5,846,659 A | 12/1998 | Hartmut et al. |
| D404,849 S | 1/1999 | Desy |
| 5,885,704 A | 3/1999 | Peiffer et al. |
| 5,896,991 A | 4/1999 | Hippely et al. |
| 5,924,129 A | 7/1999 | Gill |
| 5,937,596 A | 8/1999 | Leeuwenburgh et al. |
| 5,956,175 A | 9/1999 | Hojnowski |
| 5,972,453 A | 10/1999 | Akiwa et al. |
| 5,991,072 A | 11/1999 | Solyntjes et al. |
| 5,991,081 A | 11/1999 | Haaland et al. |
| 5,991,930 A | 11/1999 | Sorrentino |
| D418,256 S | 12/1999 | Caruana |
| 6,008,299 A | 12/1999 | Mcgrath et al. |
| 6,049,419 A | 4/2000 | Wheatley et al. |
| 6,085,358 A | 7/2000 | Cogan |
| 6,173,447 B1 | 1/2001 | Arnold |
| 6,217,099 B1 | 4/2001 | Mckinney et al. |
| 6,221,112 B1 | 4/2001 | Snider |
| 6,237,147 B1 | 5/2001 | Brockman |
| 6,250,765 B1 | 6/2001 | Murakami |
| 6,305,073 B1 | 10/2001 | Badders |
| 6,347,401 B1 | 2/2002 | Joyce |
| 6,375,865 B1 | 4/2002 | Paulson et al. |
| 6,378,133 B1 | 4/2002 | Daikuzono |
| 6,381,750 B1 | 5/2002 | Mangan |
| 6,385,776 B2 | 5/2002 | Linday |
| 6,388,813 B1 | 5/2002 | Wilson et al. |
| 6,403,005 B1 | 6/2002 | Mientus et al. |
| 6,416,872 B1 | 7/2002 | Maschwitz |
| 6,432,522 B1 | 8/2002 | Friedman et al. |
| 6,461,709 B1 | 10/2002 | Janssen et al. |
| 6,469,752 B1 | 10/2002 | Ishikawa et al. |
| 6,481,019 B2 | 11/2002 | Diaz et al. |
| 6,491,390 B1 | 12/2002 | Provost |
| 6,531,180 B1 | 3/2003 | Takushima et al. |
| 6,536,045 B1 | 3/2003 | Wilson et al. |
| 6,536,589 B2 | 3/2003 | Chang |
| 6,555,235 B1 | 4/2003 | Aufderheide et al. |
| 6,559,902 B1 | 5/2003 | Kusuda et al. |
| 6,576,349 B2 | 6/2003 | Lingle et al. |
| 6,584,614 B2 | 7/2003 | Hogg |
| 6,592,950 B1 | 7/2003 | Toshima et al. |
| 6,614,423 B1 | 9/2003 | Wong et al. |
| 6,622,311 B2 | 9/2003 | Diaz et al. |
| D480,838 S | 10/2003 | Martin |
| 6,654,071 B2 | 11/2003 | Chen |
| 6,660,389 B2 | 12/2003 | Liu et al. |
| 6,662,371 B2 | 12/2003 | Shin |
| 6,667,738 B2 | 12/2003 | Murphy |
| 6,739,718 B1 | 5/2004 | Jung |
| 6,745,396 B1 | 6/2004 | Landis et al. |
| 6,750,922 B1 | 6/2004 | Benning |
| 6,773,778 B2 | 8/2004 | Onozawa et al. |
| 6,773,816 B2 | 8/2004 | Tsutsumi |
| 6,777,055 B2 | 8/2004 | Janssen et al. |
| 6,800,378 B2 | 10/2004 | Hawa et al. |
| 6,838,610 B2 | 1/2005 | De Moraes |
| 6,841,190 B2 | 1/2005 | Liu et al. |
| 6,847,492 B2 | 1/2005 | Wilson et al. |
| 6,864,882 B2 | 3/2005 | Newton |
| 6,870,686 B2 | 3/2005 | Wilson et al. |
| 6,879,319 B2 | 4/2005 | Cok |
| 6,907,617 B2 | 6/2005 | Johnson |
| 6,911,593 B2 | 6/2005 | Mazumder et al. |
| 6,922,850 B1 | 8/2005 | Arnold |
| 6,952,950 B2 | 10/2005 | Doe et al. |
| 6,967,044 B1 | 11/2005 | O'Brien |
| D512,797 S | 12/2005 | Canavan et al. |
| 6,973,677 B2 | 12/2005 | Diaz et al. |
| 6,995,976 B2 | 2/2006 | Richardson |
| 7,070,837 B2 | 7/2006 | Ross |
| 7,071,927 B2 | 7/2006 | Blanchard |
| D526,446 S | 8/2006 | Cowan et al. |
| 7,097,080 B2 | 8/2006 | Cox |
| 7,101,810 B2 | 9/2006 | Bond et al. |
| 7,103,920 B1 | 9/2006 | Otterson |
| 7,143,979 B2 | 12/2006 | Wood et al. |
| 7,184,217 B2 | 2/2007 | Wilson et al. |
| D541,991 S | 5/2007 | Lawrence |
| 7,215,473 B2 | 5/2007 | Fleming |
| 7,226,176 B1 | 6/2007 | Huang |
| 7,238,401 B1 | 7/2007 | Dietz |
| 7,311,956 B2 | 12/2007 | Pitzen |
| D559,442 S | 1/2008 | Regelbrugge et al. |
| 7,344,241 B2 | 3/2008 | Baek |
| 7,351,470 B2 | 4/2008 | Draheim et al. |
| D569,557 S | 5/2008 | Cho |
| 7,389,869 B2 | 6/2008 | Mason, Jr. |
| 7,410,684 B2 | 8/2008 | Mccormick |
| 7,425,369 B2 | 9/2008 | Oakey et al. |
| D586,052 S | 2/2009 | Elias |
| 7,495,895 B2 | 2/2009 | Carnevali |
| 7,597,441 B1 | 10/2009 | Farwig |
| 7,629,052 B2 | 12/2009 | Brumwell |
| 7,631,365 B1 | 12/2009 | Mahan |
| 7,663,047 B2 | 2/2010 | Hanuschak |
| 7,709,095 B2 | 5/2010 | Persoone et al. |
| 7,722,921 B2 | 5/2010 | Shimoda et al. |
| 7,727,615 B2 | 6/2010 | Kato et al. |
| 7,735,156 B2 | 6/2010 | VanDerWoude et al. |
| 7,752,682 B2 | 7/2010 | Vanderwoude et al. |
| 7,812,077 B2 | 10/2010 | Borade et al. |
| 7,858,001 B2 | 12/2010 | Qin et al. |
| 7,937,775 B2 | 5/2011 | Manzella, Jr. et al. |
| 7,957,524 B2 | 6/2011 | Chipping |
| 8,024,818 B1 | 9/2011 | Davenport |
| 8,044,942 B1 | 10/2011 | Leonhard et al. |
| 8,101,277 B2 | 1/2012 | Logan et al. |
| 8,234,722 B2 | 8/2012 | VanDerWoude et al. |
| 8,261,375 B1 | 9/2012 | Reaux |
| 8,282,234 B2 | 10/2012 | VanDerWoude et al. |
| 8,292,347 B1 | 10/2012 | Drake |
| 8,294,843 B2 | 10/2012 | Hollaway |
| 8,316,470 B2 | 11/2012 | McNeal et al. |
| 8,361,260 B2 | 1/2013 | Wilson et al. |
| 8,407,818 B2 | 4/2013 | VanDerWoude et al. |
| D683,077 S | 5/2013 | Klotz et al. |
| 8,455,105 B2 | 6/2013 | Hobeika et al. |
| D692,187 S | 10/2013 | Isobe |
| D692,189 S | 10/2013 | Isobe |
| 8,567,596 B1 | 10/2013 | Mason, Jr. |
| 8,693,102 B2 | 4/2014 | Wilson et al. |
| 8,819,869 B2 | 9/2014 | VanDerWoude et al. |
| 8,889,801 B2 | 11/2014 | Liao et al. |
| 8,918,198 B2 | 12/2014 | Atanasoff |
| 8,974,620 B2 | 3/2015 | Wilson et al. |
| D726,378 S | 4/2015 | Wako |
| 8,999,509 B2 | 4/2015 | Port et al. |
| 9,023,162 B2 | 5/2015 | Mccormick et al. |
| 9,104,256 B2 | 8/2015 | Wilson et al. |
| 9,128,545 B2 | 9/2015 | Wilson et al. |
| 9,150,763 B2 | 10/2015 | Lopez et al. |
| 9,161,858 B2 | 10/2015 | Capers et al. |
| 9,170,415 B2 | 10/2015 | Mansuy |
| 9,173,437 B2 | 11/2015 | VanDerWoude et al. |
| 9,204,823 B2 | 12/2015 | Derenne et al. |
| 9,274,625 B2 | 3/2016 | Wilson et al. |
| 9,295,297 B2 | 3/2016 | Wilson |
| D759,900 S | 6/2016 | Cummings et al. |
| 9,442,306 B1 | 9/2016 | Hines et al. |
| 9,471,163 B2 | 10/2016 | Wilson et al. |

(56) References Cited

U.S. PATENT DOCUMENTS

| | | |
|---|---|---|
| 9,526,290 B2 | 12/2016 | Wilson |
| 9,575,231 B2 | 2/2017 | Chu et al. |
| D781,507 S | 3/2017 | Huh |
| D781,508 S | 3/2017 | Huh |
| 9,629,407 B2 | 4/2017 | Foster |
| 9,671,622 B1 | 6/2017 | Vetrini et al. |
| 9,706,808 B2 | 7/2017 | Sclafani et al. |
| 9,726,940 B2 | 8/2017 | Tomiyasu |
| D805,256 S | 12/2017 | Yang |
| 9,905,297 B2 | 2/2018 | Best |
| D815,190 S | 4/2018 | Dellemann |
| 9,968,155 B2 | 5/2018 | Wilson |
| 10,070,678 B2 | 9/2018 | Wilson |
| 10,165,819 B2 | 1/2019 | Klotz et al. |
| 10,201,207 B2 | 2/2019 | VanDerWoude et al. |
| 10,226,095 B2 | 3/2019 | Wilson |
| 10,227,501 B2 | 3/2019 | Hwang et al. |
| D849,240 S | 5/2019 | Guo et al. |
| D850,256 S | 6/2019 | Ryszawy |
| 10,321,731 B2 | 6/2019 | Wilson |
| 10,345,934 B2 | 7/2019 | Wilson et al. |
| 10,384,084 B2 | 8/2019 | Isham et al. |
| 10,427,385 B2 | 10/2019 | Wilson et al. |
| 10,449,397 B2 | 10/2019 | VanDerWoude et al. |
| 10,520,756 B2 | 12/2019 | Gallina et al. |
| 10,537,236 B2 | 1/2020 | Bennett et al. |
| D879,384 S | 3/2020 | Sato |
| D882,182 S | 4/2020 | Fekete |
| 10,620,670 B2 | 4/2020 | Wilson et al. |
| 10,687,569 B1 | 6/2020 | Mcdirmid |
| 10,716,986 B2 | 7/2020 | Winter et al. |
| 10,874,163 B2 | 12/2020 | VanDerWoude et al. |
| D907,299 S | 1/2021 | Brown, II et al. |
| D907,300 S | 1/2021 | Brown, II et al. |
| D925,129 S | 7/2021 | Wilson |
| D925,834 S | 7/2021 | Babin et al. |
| 11,090,516 B2 | 8/2021 | VanDerWoude et al. |
| 11,141,959 B2 | 10/2021 | Wilson et al. |
| 11,147,323 B1 | 10/2021 | Wilson |
| 11,307,329 B1 | 4/2022 | Wilson |
| 11,480,801 B1 | 10/2022 | Morris et al. |
| 11,490,667 B1 | 11/2022 | Wilson |
| 11,510,718 B2 | 11/2022 | Childers et al. |
| 11,548,356 B2 | 1/2023 | Wilson et al. |
| 11,579,339 B2 | 2/2023 | Thothadri et al. |
| 11,723,420 B2 * | 8/2023 | Wilson ............... G02B 5/208 |
| | | 128/858 |
| 2001/0035936 A1 | 11/2001 | Maisnik |
| 2002/0025441 A1 | 2/2002 | Hieda et al. |
| 2002/0036362 A1 | 3/2002 | Chigira et al. |
| 2002/0101411 A1 | 8/2002 | Chang |
| 2002/0109922 A1 | 8/2002 | Wilson et al. |
| 2002/0114934 A1 | 8/2002 | Liu et al. |
| 2002/0122925 A1 | 9/2002 | Liu et al. |
| 2002/0159159 A1 | 10/2002 | Wilson et al. |
| 2002/0195910 A1 | 12/2002 | Hus et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0121105 A1 | 6/2004 | Janssen et al. |
| 2004/0139530 A1 | 7/2004 | Yan |
| 2004/0202812 A1 | 10/2004 | Congard et al. |
| 2004/0227722 A1 | 11/2004 | Friberg et al. |
| 2004/0238690 A1 | 12/2004 | Wood et al. |
| 2004/0246386 A1 | 12/2004 | Thomas et al. |
| 2004/0258933 A1 | 12/2004 | Enniss et al. |
| 2005/0002108 A1 | 1/2005 | Wilson et al. |
| 2005/0015860 A1 | 1/2005 | Reaux |
| 2005/0071909 A1 | 4/2005 | Diaz et al. |
| 2005/0133035 A1 | 6/2005 | Yahiaoui et al. |
| 2005/0186415 A1 | 8/2005 | Mccormick et al. |
| 2005/0188821 A1 | 9/2005 | Yamashita et al. |
| 2005/0200154 A1 | 9/2005 | Barbee et al. |
| 2005/0249957 A1 | 11/2005 | Jing et al. |
| 2005/0260343 A1 | 11/2005 | Han |
| 2006/0024494 A1 | 2/2006 | Amano et al. |
| 2006/0052167 A1 | 3/2006 | Boddicker et al. |
| 2006/0056030 A1 | 3/2006 | Fukuda et al. |
| 2006/0057399 A1 | 3/2006 | Persoone et al. |
| 2006/0114245 A1 | 6/2006 | Masters et al. |
| 2006/0138694 A1 | 6/2006 | Biernath et al. |
| 2006/0158609 A1 | 7/2006 | Heil |
| 2006/0177654 A1 | 8/2006 | Shoshi |
| 2006/0204776 A1 | 9/2006 | Chen et al. |
| 2006/0254088 A1 | 11/2006 | Mccormick |
| 2006/0285218 A1 | 12/2006 | Wilson et al. |
| 2007/0019300 A1 | 1/2007 | Wilson et al. |
| 2007/0181456 A1 | 8/2007 | Kusuda et al. |
| 2007/0211002 A1 | 9/2007 | Zehner et al. |
| 2007/0212508 A1 | 9/2007 | Mase |
| 2007/0229962 A1 | 10/2007 | Mason |
| 2007/0234592 A1 | 10/2007 | Crates |
| 2007/0234888 A1 | 10/2007 | Rotolo De Moraes |
| 2007/0286995 A1 | 12/2007 | Li et al. |
| 2008/0014446 A1 | 1/2008 | Donea et al. |
| 2008/0030631 A1 | 2/2008 | Gallagher |
| 2008/0030675 A1 | 2/2008 | Dillon |
| 2008/0055258 A1 | 3/2008 | Sauers |
| 2008/0118678 A1 | 5/2008 | Huang et al. |
| 2008/0151177 A1 | 6/2008 | Wang |
| 2008/0160321 A1 | 7/2008 | Padiyath et al. |
| 2008/0176018 A1 | 7/2008 | Enniss et al. |
| 2008/0192351 A1 | 8/2008 | Miyagawa et al. |
| 2008/0231979 A1 | 9/2008 | Chen |
| 2008/0256688 A1 | 10/2008 | Bruce |
| 2008/0286500 A1 | 11/2008 | Sussner et al. |
| 2008/0292820 A1 | 11/2008 | Padiyath et al. |
| 2009/0011205 A1 | 1/2009 | Thiel |
| 2009/0026095 A1 | 1/2009 | Lofland et al. |
| 2009/0054115 A1 | 2/2009 | Horrdin et al. |
| 2009/0086415 A1 | 4/2009 | Chipping |
| 2009/0087655 A1 | 4/2009 | Yamada et al. |
| 2009/0105437 A1 | 4/2009 | Determan et al. |
| 2009/0119819 A1 | 5/2009 | Thompson |
| 2009/0181242 A1 | 7/2009 | Enniss et al. |
| 2009/0233032 A1 | 9/2009 | Craig |
| 2009/0239045 A1 | 9/2009 | Kato et al. |
| 2009/0239048 A1 | 9/2009 | Sugihara et al. |
| 2010/0026646 A1 | 2/2010 | Xiao et al. |
| 2010/0033442 A1 | 2/2010 | Kusuda et al. |
| 2010/0102197 A1 | 4/2010 | Mcintyre |
| 2010/0102476 A1 | 4/2010 | Higgins |
| 2010/0122402 A1 | 5/2010 | Tipp |
| 2010/0146679 A1 | 6/2010 | Heil |
| 2010/0238119 A1 | 9/2010 | Dubrovsky et al. |
| 2010/0245273 A1 | 9/2010 | Hwang et al. |
| 2010/0270189 A1 | 10/2010 | Pedersen, II et al. |
| 2011/0007388 A1 | 1/2011 | Wilson et al. |
| 2011/0010994 A1 | 1/2011 | Wilson et al. |
| 2011/0012841 A1 | 1/2011 | Lin |
| 2011/0013273 A1 | 1/2011 | Wilson et al. |
| 2011/0014481 A1 | 1/2011 | Wilson et al. |
| 2011/0035936 A1 | 2/2011 | Lee |
| 2011/0052864 A1 | 3/2011 | Son |
| 2011/0097574 A1 | 4/2011 | Faldysta et al. |
| 2011/0119801 A1 | 5/2011 | Wright |
| 2011/0165361 A1 | 7/2011 | Sherman et al. |
| 2011/0168261 A1 | 7/2011 | Welser et al. |
| 2011/0267793 A1 | 11/2011 | Cohen et al. |
| 2011/0271497 A1 | 11/2011 | Suh et al. |
| 2011/0277361 A1 | 11/2011 | Nichol et al. |
| 2011/0279383 A1 | 11/2011 | Wilson et al. |
| 2012/0003431 A1 | 1/2012 | Huang |
| 2012/0030095 A1 | 2/2012 | Marshall et al. |
| 2012/0047614 A1 | 3/2012 | Choi |
| 2012/0070603 A1 | 3/2012 | Hsu |
| 2012/0081792 A1 | 4/2012 | Neuffer |
| 2012/0137414 A1 | 6/2012 | Saylor |
| 2012/0180204 A1 | 7/2012 | Hawkins |
| 2012/0183712 A1 | 7/2012 | Leonhard et al. |
| 2012/0188743 A1 | 7/2012 | Wilson et al. |
| 2012/0200816 A1 | 8/2012 | Krasnov et al. |

(56) References Cited

U.S. PATENT DOCUMENTS

| | | |
|---|---|---|
| 2012/0291173 A1 | 11/2012 | Gleason et al. |
| 2013/0045371 A1 | 2/2013 | O'Donnell |
| 2013/0083285 A1 | 4/2013 | McNeal et al. |
| 2013/0089688 A1 | 4/2013 | Wilson et al. |
| 2013/0098543 A1 | 4/2013 | Reuter et al. |
| 2013/0141693 A1 | 6/2013 | McCabe et al. |
| 2013/0145525 A1 | 6/2013 | Arenson et al. |
| 2013/0222913 A1 | 8/2013 | Tomoda et al. |
| 2013/0247286 A1 | 9/2013 | Vanderwoude et al. |
| 2013/0293959 A1 | 11/2013 | Mcdonald |
| 2014/0020153 A1 | 1/2014 | Romanski et al. |
| 2014/0050909 A1 | 2/2014 | Choi et al. |
| 2014/0220283 A1 | 8/2014 | Wilson et al. |
| 2014/0259321 A1 | 9/2014 | Arnold |
| 2014/0289937 A1 | 10/2014 | Capers et al. |
| 2015/0033431 A1 | 2/2015 | Hofer Kraner et al. |
| 2015/0131047 A1 | 5/2015 | Saylor et al. |
| 2015/0202847 A1 | 7/2015 | Johnson et al. |
| 2015/0234209 A1 | 8/2015 | Miyamoto et al. |
| 2015/0258715 A1 | 9/2015 | Ohta |
| 2015/0294656 A1 | 10/2015 | Hanuschak |
| 2015/0309609 A1 | 10/2015 | Wilson et al. |
| 2015/0349147 A1 | 12/2015 | Xi et al. |
| 2015/0359675 A1 | 12/2015 | Wilson |
| 2016/0023442 A1 | 1/2016 | Faris |
| 2016/0050990 A1 | 2/2016 | Hayes |
| 2016/0073720 A1 | 3/2016 | Niedrich |
| 2016/0231834 A1 | 8/2016 | Hardi |
| 2016/0259102 A1 | 9/2016 | Taka |
| 2016/0271922 A1 | 9/2016 | Uzawa et al. |
| 2016/0291543 A1 | 10/2016 | Saito |
| 2016/0318227 A1 | 11/2016 | Kim et al. |
| 2017/0052286 A1 | 2/2017 | Hines et al. |
| 2017/0071792 A1 | 3/2017 | Wilson et al. |
| 2017/0079364 A1 | 3/2017 | Paulson |
| 2017/0129219 A1 | 5/2017 | Uebelacker et al. |
| 2017/0173923 A1 | 6/2017 | Davis et al. |
| 2017/0192131 A1 | 7/2017 | Wilson et al. |
| 2017/0208878 A1 | 7/2017 | Kakinuma et al. |
| 2017/0232713 A1 | 8/2017 | Mannheim Astete et al. |
| 2017/0281414 A1 | 10/2017 | Wilson |
| 2017/0299898 A1 | 10/2017 | Gallina et al. |
| 2017/0318877 A1 | 11/2017 | Yahiaoui et al. |
| 2018/0029337 A1 | 2/2018 | Wilson et al. |
| 2018/0042324 A1 | 2/2018 | King |
| 2018/0052334 A1 | 2/2018 | Repko |
| 2018/0094164 A1 | 4/2018 | Ito et al. |
| 2018/0148578 A1 | 5/2018 | Ohta et al. |
| 2018/0161208 A1 | 6/2018 | Huh |
| 2018/0229480 A1 | 8/2018 | Chung |
| 2018/0236753 A1 | 8/2018 | Wykoff, II et al. |
| 2018/0295925 A1 | 10/2018 | Gagliardo et al. |
| 2018/0338550 A1 | 11/2018 | Boulware et al. |
| 2019/0021430 A1 | 1/2019 | Elliott |
| 2019/0037948 A1 | 2/2019 | Romanski et al. |
| 2019/0116300 A1 | 4/2019 | Okuno |
| 2019/0118057 A1 | 4/2019 | Winter et al. |
| 2019/0209912 A1 | 7/2019 | Isserow et al. |
| 2019/0212474 A1 | 7/2019 | Le Quang et al. |
| 2019/0346591 A1 | 11/2019 | Thothadri et al. |
| 2019/0389182 A1 | 12/2019 | Wilson et al. |
| 2020/0100657 A1 | 4/2020 | Lee et al. |
| 2020/0115519 A1 | 4/2020 | Phillips et al. |
| 2020/0124768 A1 | 4/2020 | Wilson |
| 2020/0134773 A1 | 4/2020 | Pinter et al. |
| 2020/0154808 A1 | 5/2020 | Inouye |
| 2020/0178622 A1 | 6/2020 | Jascomb et al. |
| 2020/0247102 A1 | 8/2020 | Wilson et al. |
| 2020/0261055 A1 | 8/2020 | Zwierstra et al. |
| 2020/0281301 A1 | 9/2020 | Wynalda, Jr. |
| 2020/0359718 A1 | 11/2020 | Jefferis et al. |
| 2020/0375272 A1 | 12/2020 | Ulmer et al. |
| 2020/0384747 A1 | 12/2020 | Fukuda et al. |
| 2021/0030095 A1 | 2/2021 | Reicher |
| 2021/0162645 A1 | 6/2021 | Wilson et al. |
| 2021/0298380 A1 | 9/2021 | Brown, II et al. |
| 2021/0298388 A1* | 9/2021 | Nabai ............... A41D 13/1115 |
| 2021/0298390 A1 | 9/2021 | Sup, IV et al. |
| 2021/0307425 A1 | 10/2021 | Keim |
| 2021/0315291 A1 | 10/2021 | Votolato et al. |
| 2021/0318553 A1 | 10/2021 | Gharabegian |
| 2021/0321692 A1 | 10/2021 | Wilson |
| 2021/0321693 A1 | 10/2021 | Wilson et al. |
| 2021/0329999 A1 | 10/2021 | Ackerman |
| 2021/0368886 A1 | 12/2021 | Swart et al. |
| 2021/0386155 A1 | 12/2021 | Rose |
| 2021/0393440 A1 | 12/2021 | Leatt et al. |
| 2021/0394427 A1 | 12/2021 | Frisco et al. |
| 2022/0015472 A1 | 1/2022 | Boza |
| 2023/0106407 A1 | 4/2023 | Arima et al. |

FOREIGN PATENT DOCUMENTS

| | | |
|---|---|---|
| CA | 2386043 A1 | 11/2003 |
| DE | 3637188 A1 | 5/1988 |
| DE | 19808535 A1 | 9/1999 |
| DE | 202004010014 U1 | 4/2005 |
| DE | 202020101562 U1 | 4/2020 |
| DE | 202020101794 U1 | 4/2020 |
| EP | 192075 A2 | 8/1986 |
| EP | 671258 A2 | 9/1995 |
| EP | 1471415 A2 | 10/2004 |
| EP | 1517791 A2 | 3/2005 |
| EP | 1047537 B1 | 3/2010 |
| EP | 3157480 A1 | 4/2017 |
| GB | 2310862 A | 9/1997 |
| GB | 2492574 A | 1/2013 |
| JP | 61017860 A | 1/1986 |
| JP | S6117860 A | 1/1986 |
| JP | 62053832 A | 3/1987 |
| JP | 04314537 A | 11/1992 |
| JP | 06143496 A | 5/1994 |
| JP | 07021456 A | 1/1995 |
| JP | 10167765 A | 6/1998 |
| JP | 2000334812 A | 12/2000 |
| JP | 2002328613 A | 11/2002 |
| JP | 2012183822 A | 9/2012 |
| JP | 2014032222 A | 2/2014 |
| JP | 2015128896 A | 7/2015 |
| JP | 6767596 B1 | 10/2020 |
| KR | 20120001292 A | 1/2012 |
| TW | 200700793 A | 1/2007 |
| TW | 201027992 A | 7/2010 |
| WO | 0024576 A1 | 5/2000 |
| WO | 03052678 A1 | 6/2003 |
| WO | 2009008857 A1 | 1/2009 |
| WO | 2015009114 A1 | 1/2015 |
| WO | 2015091425 A1 | 6/2015 |
| WO | 2015093413 A1 | 6/2015 |
| WO | 2015195814 A1 | 12/2015 |
| WO | 2019006151 A1 | 1/2019 |
| WO | 2019055267 A1 | 3/2019 |
| WO | 2021176316 A1 | 9/2021 |

OTHER PUBLICATIONS

Gregory Brower et al.; "Complaint for Patent Infringement"; Sep. 15, 2015; 15 pages.
Jeffrey A. Silverstri et al.; "Answer to Complaint for Patent Infringement"; Oct. 7, 2015; 59 pages.
United States Patent and Trademark Office; Office Action for U.S. Appl. No. 15/090,681; Aug. 26, 2016; 8 pages.
List of References cited by applicant and considered by Examiner for U.S. Appl. No. 15/090,681; Receipt date Jun. 30, 2016; 3 pages.
List of References cited by applicant and considered by Examiner for U.S. Appl. No. 15/090,681; Receipt date Apr. 27, 2016; 4 pages.
Examiner's search strategy and results for U.S. Appl. No. 15/090,681; Aug. 21, 2016; 2 pages.
*Aevoe Corp.* v. *Racing Optics, Inc.*; Case No. IPR2016-01164; Petition for Inter Partes Review of U.S. Pat. No. 9,104,256 (including Exhibits 1001-1011 and Petitioner Power of Attorney Pursuant to 37 C.F.R. 42. 10(b) for Petition for Inter Partes Review); Jun. 21, 2016.

(56) References Cited

OTHER PUBLICATIONS

*Aevoe Corp.* v. *Racing Optics, Inc.*; Case No. IPR2016-01165; Petition for Inter Partes Review of U.S. Pat. No. 9,128,545(including Exhibits 1001-1006 and Petitioner Power of Attorney Pursuant to 37 C.F.R. 42. 10(b) for Petition for Inter Partes Review); Jun. 21, 2016.
*Aevoe Corp.* v. *Racing Optics, Inc.*; Case No. IPR2016-01166; Petition for Inter Partes Review of U.S. Pat. No. 9,274,625 (including Exhibits 1001-1011 and Petitioner Power of Attorney Pursuant to 37 C.F.R. 42. 10(b) for Petition for Inter Partes Review); Jun. 21, 2016.
Exhibit 1—Invalidity Contentions re: '545 Patent Under LPR 1-8(b)-(d); at least as early as Jul. 1, 2016.
Exhibit 2—Invalidity Contentions re: '256 Patent Under LPR 1-8(b)-(d); at least as early as Jul. 1, 2016.
Exhibit 3—Invalidity Contentions re: '620 Patent Under LPR 1-8(b)-(d); at least as early as Jul. 1, 2016.
Exhibit 4—Invalidity Contentions re: '625 Patent Under LPR 1-8(b)-(d); at least as early as Jul. 1, 2016.
Exhibit 1002—U.S. Pat. No. 5,364,671 to Gustafson; Case IPR2016-01745; Inter Partes Review of U.S. Pat. No. 8,974,620; at least as early as Sep. 7, 2016; pp. 1-6.
Exhibit 1004—U.S. Pat. No. 7,351,470 to Draheim et al.; Case IPR2016-01745; Inter Partes Review of U.S. Pat. No. 8,974,620; at least as early as Sep. 7, 2016; pp. 1-15.
Exhibit 1001—U.S. Pat. No. 8,974,620 to Wilson et al.; Case IPR2016-01745; Inter Partes Review of U.S. Pat. No. 8,974,620; at least as early as Sep. 7, 2016; pp. 1-15.
Exhibit 1003—U.S. Pat. No. 6,250,765 to Murakami; Case IPR2016-01745; Inter Partes Review of U.S. Pat. No. 8,974,620; at least as early as Sep. 7, 2016; p. 1-8.
Exhibit 1005—U.S. Pat. No. 7,957,524 to Chipping; Case IPR2016-01745; Inter Partes Review of U.S. Pat. No. 8,974,620; at least as early as Sep. 7, 2017; pp. 1-20.
Aevoe Corp., Racing Optics, Inc.; Petition for Inter Partes Review; Case IPR2016-01745; Inter Partes Review of U.S. Pat. No. 8,974,620; at least as early as Sep. 7, 2016; pp. 1-55.
Exhibit 1006—Japanese Application No. JP 2002-328613 to Kitaguchi Translation; IPR2016-01745; at least as early as Sep. 7, 2016; pp. 1-10.
Exhibit 1009—U.S. Appl. No. 13/838,311; Interview Summary; Case IPR2016-01745; Inter Partes Review of U.S. Pat. No. 8,974,620; at least as early as Sep. 7, 2016; p. 1-3.
Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.
*Aevoe Corp.* v. *Racing Optics, Inc.*; Declaration of Darran Cairns; Case IPR2016-01745; Inter Partes Review of U.S. Pat. No. 8,974,620; at least as early as Sep. 7, 2016; pp. 1-32.
*Aevoe Corp.* v. *Racing Optics, Inc.*; Petitioner's Power of Attorney; Case IPR2016-01745; Inter Partes Review of U.S. Pat. No. 8,974,620; at least as early as Sep. 7, 2016; pp. 1-3.
Exhibit 1007—U.S. Appl. No. 13/838,311; Response to Office Action; Case IPR2016-01745; Inter Partes Review of U.S. Pat. No. 8,974,620; at least as early as Sep. 7, 2016; p. 1-19.
Exhibit 1008—U.S. Appl. No. 13/838,311; Response and Request for Continued Examination; Case IPR2016-01745; Inter Partes Review of U.S. Pat. No. 8,974,620; at least as early as Sep. 7, 2016; pp. 1-21.
*Aevoe Corp.* v. *Racing Optics, Inc.*; Mandatory Notices; Case IPR2016-01745; Inter Partes Review of U.S. Pat. No. 8,974,620; at least as early as Sep. 7, 2016; pp. 1-4.
*Aevoe Corp.* v. *Racing Optics, Inc.*; Power of Attorney; Case IPR2016-01745; Inter Partes Review of U.S. Pat. No. 8,974,620; at least as early as Sep. 7, 2016; pp. 1-4.
*Aevoe Corp* v. *Racing Optics, Inc.*; Notice of Filing Date; Case IPR2016-01745; Inter Partes Review of U.S. Pat. No. 8,974,620; at least as early as Sep. 6, 2016; p. 1-5.

*Aevoe Corp* v. *Racing Optics, Inc.*; Decision; Case IPR2016-01164; Inter Partes Review of U.S. Pat. No. 9,104,256; at least as early as Nov. 7, 2016; p. 1-24.
*Aevoe Corp* v. *Racing Optics, Inc.*; Decision; Case IPR2016-01166; Inter Partes Review of U.S. Pat. No. 9,274,625; at least as early as Nov. 7, 2016; p. 1-23.
*Aevoe Corp* v. *Racing Optics, Inc.*; Decision; Case IPR2016-01165; Inter Partes Review of U.S. Pat. No. 9,128,545; at least as early as Nov. 7, 2016; p. 1-25.
Settlement and License Agreement, Dec. 21, 2007, 28 pgs.
United States Patent and Trademark Office; Office Action dated Dec. 21, 2016 pertaining to U.S. Appl. No. 15/090,681, filed Apr. 5, 2016; 8 pages.
PCT Search Report and Written Opinion for US2020/016245 (Apr. 28, 2020).
Professional Plastics (http://www.professionalplastics.com/MelinexPETFilmDupont) 2012.
Whitney, Frank D., Preliminary Injunction, Aug. 21, 2007, 5 pgs.
Higgins, John P., Answer and Counterclaims to First Amended Complaint, Sep. 4, 2007, 27 pgs.
Ballato, John, Expert Report of John Ballato, Ph.D., Nov. 12, 2007, 5 pgs.
Russell, Geoffrey A., Rebuttal Report of Geoffrey A. Russell, Ph.D., on issues raised in the Export Report of John Ballato, Ph.D., Nov. 21, 2007, 15 pgs.
Higgins, John P., Defendants' Second Supplement to its Response to Plaintiffs' First Set of Interrogatories, Dec. 7, 2007, 25 pgs.
Barnhardt, John J. III, Redacted Version Defendants' Memorandum in Support of Motion for Partial Summary Judgment, Dec. 3, 2007, 36 pgs.
Higgins, John P., Defendants' Second Supplement to its Response to Plaintiffs' First Set of Interrogatories, Dec. 7, 2007, 26 pgs.
Whitney, Frank D., Consent Judgment Order, Jan. 3, 2008, 5 pgs.
Ballato, John, Supplemental Expert Report of John Ballato, Ph.D., Nov. 19, 2007, 10 pgs.
Moore, Steven D., Plaintiffs' Motion to Strike Defendants' New and Untimely Invalidity Theory, Dec. 19, 2007, 3 pgs.
Moore, Steven D., Plaintiffs' Brief in Support of Motion to Strike Defendants' New and Untimely Invalidity Theory, Dec. 19, 2007, 10 pgs.
Barnhardt, John J. III, Notice Pursuant to 35 U.S.C. 282, Dec. 18, 2007, 3 pgs.
Office Action for Canadian Patent Application No. 2,952,436; Jul. 8, 2020.
Prosecution History of U.S. Re-Examination U.S. Appl. No. 95/002,073 titled Touch Screen Protector; pp. 1-1,980.
www.store.moshimode.com; "iVisor AG for iPad 2 Black"; 2004-2010.
Defendant's Motion for Summary Judgment; Oct. 25, 2013; pp. 1-31.
Jake Gaecke; "Appletell Reviews the iVisor for iPad"; www.appletell.com; Sep. 15, 2010 at 12:32 p.m. www.technologytell.com/apple/60407/appletell-reviews-ag-for-ipad/; 2 pages.
www.nushield.com/technology.php; "What Makes NuShield Screen Protectors Superior", 2 pages.
www.spigen.com; "Something you Want"; 2 pages.
www.zagg.com; "Apple iPad 2 (Wi-Fi 3G) Screen Protector"; 2 pages.
www.gadgetguard.com; "Invisible Gadget Guard, the Original"; 1 page.
www.incipotech.com; "Protect Your iPhone 4 with Screen Protectors from Incipo"; 3 pages.
www.store.moshimonde.com; "iVisor AG iPad Screen Protector"; Jul. 2010; 7 pages.
www.store.moshimonde.com; "iVisor XT Crystal Clear Protector for iPad"; Aug. 2010; 3 pages.
www.store.moshimonde.com; "iVisor AG for iPad 2 Black"; Mar. 2011; 5 pages.
www.store.moshimonde.com; "iVisor AG for iPad 2 White"; Mar. 2011; 3 pages.
www.store.moshimonde.com; "iVisor AG for iPhone 4/4S Black"; Nov. 2010; 5 pages.

(56) References Cited

OTHER PUBLICATIONS www.store.moshimonde.com; "iVisor AG for iPhone 4/4S White"; May 2010; 4 pages.

Dictionary.com (http://dictionary.reference.com) 2012.

*Racing Optics, Inc.* v. *Aevoe, Inc., d/b/a/ Moshi*; Case No. 15-cv-017744-JCM-VCF; Aevoe's Initial Disclosure Non-Infringement, Invalidity and Unenforceability Contentions (Redacted) dated Jan. 7, 2016.

Defendant Aevoe Corp.'s Non-Infringement Contentions and Responses to Racing Optic's Disclosure of Asserted Claims and Infringement Contentions (U.S. Pat. No. 9,128,545) dated Jan. 7, 2016.

Defendant Aevoe Corp.'s Non-Infringement Contentions and Responses to Racing Optic's Disclosure of Asserted Claims and Infringement Contentions (U.S. Pat. No. 9,104,256) dated Jan. 7, 2016.

Defendant Aevoe Corp.'s Non-Infringement Contentions and Responses to Racing Optic's Disclosure of Asserted Claims and Infringement Contentions (U.S. Pat. No. 8,974,620) dated Jan. 7, 2016.

*I-Blason LLC* v. *Aevoe, Inc. and Aevoe Corp.*; Case IPR2016-TBA; Petition for Inter Partes Review of U.S. Pat. No. 8,044,942 (including Exhibits 1001-1019).

Dupont Teijin Films, "Mylar Polyester Film—Optical Properties", Jun. 2003, 2 pages.

https://en.wikipedia.org/wiki/Black_body, "Black Body", Jul. 2009, 11 pages.

https://en.wikipedia.org/wiki/Infrared, "Infrared", Jul. 2009, 12 pages.

https://en.wikipedia.org/wiki/BoPET, "PET Film (biaxially oriented)", Jul. 2009, 4 pages.

Instashield LLC, Bionic Wrench® Inventor Creates Low-Cost Face Shield for Masses, Apr. 15, 2020, 3 pages.

Tom Zillich, Surrey manufacturer hopes to hit home run with face shield that clips to baseball cap, Apr. 29, 2020, 3 pages.

Opentip, Opromo Safety Face Shield Visor for Adult Kids, Protective Cotton Hat with Removable PVC Face Cover <https://www.opentip.com/product.php?products_id=11699030>, May 5, 2020, 3 pages.

Hefute, Hefute 5 PCS Protective Face Cover with Shield Comfortable Full Protection Face Compatiable with Glasses Anti-Droplet Anti-Pollution and Windproof Transparent Safety Face Cover with Shield(Style B) <https://www.amazon.com/dp/B086GSG8DH/ref=sspa_dk_detail_9?psc=1&pd_rd_i=B086GSG8DH&pd_rd_w=Ocdm2&pf_rd_p=48d372c1-f7e1-4b8b-9d02-4bd86f5158c5&pd_rd_wg=qkB2b&pf_rd_r=M%E2%80%A6>, May 6, 2020, 7 pages.

Geanbaye, Geanbaye Safety Full Face Shield Cap Detachable Baseball Cap Anti-Saliva Anti-Spitting Eye Protective Hat Windproof Dustproof <https://www.amazon.com/dp/B086DV32B8/ref=sspa_dk_detail_8?psc=1&pd_rd_i=B086DV32B8&pd_rd_w=MwjfT&pf_rd_p=48d372c1-f7e1-4b8b-9d02-4bd86f5158c5&pd_rd_wg=pxuOs&pf_rd_r=PNDA%E2%80%A6>, May 5, 2020, 8 pages.

Leigh Buchanan, These 2 Companies are Making Face Shields for Everyone <https://www.inc.com/leigh-buchanan/face-shields-coronavirus-protection-open-source.html>, May 6, 2020, 8 pages.

Brim Shield, photographs, Apr. 21, 2020, 1 pages.

Hatshield, Shield Yourself With the Hatshield <https://www.hatshield.com/?gclid=CjwKCAjwp-XOBRAFEiwAheRui1u89v_3URuiwEVvBRGa9TaEfWoZVMJXRkWsZgPTUw-0fHJ5HD-8uhoCc84QAvD_BwE>, Apr. 17, 2020, 11 pages.

Eli N. Perencevich, Moving Personal Protective Equipment Into the Community Face Shields and Containment of COVID-19, Apr. 29, 2020, 2 pages.

Chang, Tian-Ci; Cao, Xun; Bao, Shan-Hu; Ji, Shi-Dong; Luo, Hong-Jie; Jin, Ping; Review of Thermochromic Vanadium Dioxide Based Smart Coatings: From Lab to Commercial Application; Dec. 16, 2017.

Saudi Basic Industries Corporation (SABIC); "The Department of Transportation [DOT] Guidebook"; Oct. 2016.

Hostaphan RBB, "Transparent, Temperature Stable Polyester Film for Cooking & Roasting Bags" Jul. 2016.

Hostaphan Win, "White, Long-Term Stable, Thermally Stable Polyester Film for PV Back Sheet Laminates"; Jul. 2016.

PCT Search Report & Written Opinion for PCT/US2019/054565 (Dec. 20, 2019).

PCT Search Report & Written Opinion for PCT/US2015/036248 (Sep. 16, 2015).

"Declaration of Jerome Aho"; Filed Aug. 3, 2007; Case 3:07-cv-00221-FDW-DCK; Includes: Exhibit A, Nascar Postcard (1 page), Exhibit B, 50th Anniversary Nascar letter sent Jan. 7, 1998 (1 page), and Exhibit C, Front page of "The Official Nascar Preview and Press Guide" (1 page); 9 pages.

*Racing Optics, Inc.* v. *David Leon O'Neal, Edward M. Wallace and Clear View Racing Optics, LLC*; Case 3:07 CV 221; Includes: Exhibit A, Wilson et al. U.S. Pat. No. 6,847,492; and Exhibit B, Wilson et al. U.S. Pat. No. 7,184,217; 34 pages.

International Search Report; International Application No. PCT/US99/95128; Date of Completion: Jan. 18, 2000; 54 pages.

International Search Report; International Application No. PCT/US02/10971; Date of Completion: Nov. 20, 2002; 3 pages.

International Search Report; International Application No. PCT/US03/16284; Date of Completion: Mar. 9, 2004; 3 pages.

European Search Report for Application No. 15809930.9-107 / 3157480 (Dec. 15, 2017).

Canadian Office Action for Application Serial No. 2,952,436 (Nov. 15, 2019).

Canadian Office Action for Application Serial No. 2,952,436 (May 3, 2019).

Australian Examination Report for Application Serial No. 2015277196 (Oct. 18, 2018).

www.wikipedia.org, Refractive Index, Oct. 31, 2014.

www.wikipedia.org. "Black Body", Jul. 2009, 11 pages.

www.wikipedia.org. "Infrared", Jul. 2009, 12 pages.

www.wikipedia.org. "PET Film (biaxially oriented)", Jul. 2009, 4 pages.

PCT International Application No. PCT/US99/25128 with International Search Report, Date of Completion Jan. 18, 2000, 54 Pages.

English translation of TW201027992, "Monitor Protection Device for a Flat Panel Display", 11 pgs.

Pulse Racing Innovations, EZ Tear Universal Single Pull Tearoff Ramp, webpage <https://www.pulseracinginnovations.com>, Dec. 30, 2020, 6 pages.

PCT International Search Report and Written Opinion for International Application No. PCT/US20/24639, Jun. 11, 2020, 13 pages.

PCT International Search Report and Written Opinion for International Application No. PCT/US2020/049919; Nov. 27, 2020.

Tian-Chi Chang, Xun Cao, Shan-Hu Bao, Shi=Dong Ji, Hong-Jie Luo, Ping Jin; "Review on Thermochromic Vanadium Dioxide Based Smart Coatings: From Lab to Commercial Application"; Dec. 16, 2017.

PCT International Search Report and Written Opinion for International Application No. PCT/US2020/062230; Feb. 8, 2021.

"Anti-reflective coating," Wikipedia, last updated Jul. 13, 2017 by Andy Dingley, <https://en.m.wikipedia.org/wiki/Anti-reflective_coating>.

"Monotonic function," Wikipedia, accessed May 24, 2017, <https://en.wikipedia.org/wiki/Monotonic_function>.

"Thin Film," Wikipedia, last updated Jun. 20, 2017, <https://en.wikipedia.org/wiki/Thin_film>.

"Tips to Get Quality Anti-Reflection Optical Coatings," Penn Optical Coatings, accessed May 24, 2017, <http://www.pennoc.com/tipsgetqualityantireflectionopticalcoatings/>.

Langlet, M., "Antireflective Films", from Chapter 15 of Handbook of Sol-Gel Science and Technology Processing Characterization and Applications, copyright 2005, pp. 332-334, 337, 339-341., taken from website <https://books.google.com/books?id=i9swy1D2HxlC&lpg=PA339&dq=AR%20thick%20film%20coatings&pg=PA339#v=onepage&q=AR%20thick%20film%20coatings&f=false>.

Li, H .- M et al., "Influence of weight ratio in polymer blend film on the phase separation structure and its optical properties", The European Physical Journal Applied Physics, 45, 20501, published Jan. 31, 2009, EDP Sciences, 4 pages.

MDS Nordion, "Gamma Compatible Materials," Datasheet, Aug. 2007, 4 pages, <https://ab-div-bdi-bl-blm.web.cern.ch/ Radiation/Gamma_Compatible_Materials_List_company.pdf>, retrieved on Sep. 29, 2021.

(56) References Cited

OTHER PUBLICATIONS

Zhang, Xin_Xiang et al., Abstract of "One-step sol-gel preparation of PDMS-silica ORMOSILs as environment-resistant and crack-free thick antireflective coatings," Journal of Materials Chemistry, Issue 26, 2012, <http://pubs.rsc.org/en/content/articlelanding/2012/m/c2jm31005h#!divAbstract>.

PCT International Search Report and Written Opinion for International Application No. PCT/US2017/044438, dated Oct. 23, 2017, 12 pages.

Chemical Book, "Benzophenone", https://www.chemicalbook.com/Chemical ProductProperty_EN_CB57 44679.htm, available at least as of 2017, accessed on line on Dec. 15, 2021 (Year: 2017).

Chemical Book, "Polymethylhydrosiloxane", https://www.chemicalbook.com/Chemical ProductProperty _EN_ CB3694969.htm, available at least as of 2017, accessed online on Dec. 15, 2021 (Year: 2017).

Guide Chem, "UV Stabilizer", https://wap.guidechem.com/trade/uv-stabilizer-uv-absorber-ligh-id3578792.html, available at least as of 2018, accessed online on Dec. 15, 2021 (Year: 2018).

Hostaphan RBB biaxially oriented film data sheet (Year: 2011).

PCT International Search Report and Written Opinion for International Application No. PCT/US2020/024639; Jun. 11, 2020.

PCT International Search Report and Written Opinion for International Application No. PCT/US2021/026165, dated Jul. 9, 2021, 10 pages.

PCT International Search Report and Written Opinion for International Application No. PCT/US21/20421, May 20, 2021, 8 pages.

Wiseman, Sr., United States Statutory Invention Registration No. H1023, published Mar. 3, 1992, 7 pages.

Chemical Book, Bis(1,2,2,6,6-pentamethyl-4-piperidyl) sebacate, available online at least as of 2017, https://www.chemicalbook.com/ChemicalProductProperty_EN_CB8121619.htm, accessed online Mar. 15, 2022 (Year: 2017).

Pearson Dental, "UV Protection Face Shields", https://www.pearsondental.com/catalog/subcat_thumb.asp?majcatid=750&catid=10149, available online at least as of Jan. 27, 2021 per Internet Archive, accessed online on Sep. 15, 2021. (Year: 2021).

Patent Cooperation Treaty, International Search Report and Written Opinion for International Application No. PCT/US2022/031823, mailed Jul. 14, 2022, 11 pages.

Patent Cooperation Treaty, International Search Report and Written Opinion for International Application No. PCT/US2022/046171, mailed Jan. 18, 2023, 15 pages.

Patent Cooperation Treaty, International Search Report and Written Opinion for International Application No. PCT/US2023/012316, mailed Apr. 14, 2023, 11 pages.

Patent Cooperation Treaty, International Search Report and Written Opinion for International Application No. PCT/US2023/26598, mailed Sep. 12, 2023, 7 pages.

\* cited by examiner

LOW HAZE UV BLOCKING REMOVABLE LENS STACK

CROSS-REFERENCE TO RELATED APPLICATIONS

This application is a continuation of U.S. patent application Ser. No. 17/938,308, filed Oct. 5, 2022, which is a continuation of U.S. patent application Ser. No. 17/342,373, filed Jun. 8, 2021, now U.S. Pat. No. 11,490,667, issued Nov. 8, 2022, the contents of which are expressly incorporated herein by reference.

STATEMENT RE: FEDERALLY SPONSORED RESEARCH/DEVELOPMENT

Not Applicable

BACKGROUND

In an operating room environment, there is a need for a protective face shield with low haze, removable outer layer(s), ultraviolet (UV) radiation blocking properties, and stabilization during the sterilization process, both gamma irradiation and ethylene oxide (EO) sterilization.

Haze is an optical phenomenon which happens in both reflection and transmission. In reflection, the eye sees glare, scatter, and halos. In transmission, the visible light is reduced or darkened by internal scatter and is seen by the eye as milky and not clear. In order to meet the American National Standard for Occupational and Educational Personal Eye and Face Protection Devices (ANSI Z87.1-2020) and be classified as a protective face shield, the final product must have less than 3% haze. More than 3% haze in a face shield can give the user a dizzy or sick feeling. Ideally, a protective face shield used in the operating room should have 1% or less haze.

Removable outer layer(s) are needed when the surgeon or operating personnel get splatter that impairs their view during a procedure. Cleaning or wiping the face shield leads to smearing, and breaking the sterile field in the operating room to change face shields and gowns is time consuming and adds to the risk of infecting the patient.

UV blocking is necessary in the operating room to protect the operating personnel's face and eyes because some hospitals use lighting which can generate UV rays: quartz, halogen, tungsten or xenon. Some hospitals also use UVC lights to help reduce airborne pathogens.

Stability during sterilization is critical for both EO and gamma irradiation sterilization processes. Single-use medical products used during surgery must be sterile. Common methods to sterilize plastics include gamma irradiation and EO gas. After either or both processes, the laminated stack must be free from viable micro-organisms (including in between each laminated layer). Additionally, the optical stack performance and physical characteristics cannot change, including but not limited to discoloration, outgassing, optical defects, or delamination.

The current state-of-the-art solution is a laminated stack of index-matched removable lenses made from polyester film (PET). Optical quality PET is super clear with low haze and can be sterilized with EO and gamma without negatively impacting the optics, tensile strength or color. Polycarbonate, for example, can turn brown in color under gamma sterilization. However, PET is transparent to ultraviolet radiation (i.e. it transmits UV rays to the wearer). Therefore, a thin UV blocking layer is added to the base layer PET. A common UV blocking film is Hostaphan® 7333UV, made by Mitsubishi Polyester Film Group. The most common gauge or thickness used for this application is 1 mil because this is the gauge with the least amount of haze. The 1-mil thick UV blocking PET film from Mitsubishi has 1% haze. A 7-mil thick UV blocking PET film has 4% haze. An example face shield construction beginning from the base layer may be 7-mil PET, permanent adhesive, 1-mil UV blocking PET, removable adhesive, 2-mil PET, removable adhesive, 2-mil PET.

The most common test method for haze and visual light transmission is the Standard Test Method for Haze and Luminous Transmittance of Transparent Plastics (ASTM D1003). It utilizes a haze meter and spectrophotometer. The above-described state-of-the-art protective face shield results in haze of 2.05% and VLT of 88.7% according to this standard. This meets the specification for a protective face shield (ANSI Z87.1-2020) but has twice the haze of an ideal operating room face shield. Considering that haze in an optical stack is additive, it is preferred that each layer in the stack has less than 0.5% haze.

BRIEF SUMMARY

The present disclosure contemplates various protective lens stacks and face shields for overcoming the above drawbacks accompanying the related art. One aspect of the embodiments of the disclosure is a protective lens stack. The protective lens stack may comprise a base layer including a polyethylene terephthalate (PET) film containing a UV blocking additive. The protective lens stack may further include one or more removable lens layers stacked on top of the base layer, each of the removable lens layers including a PET film and a first adhesive disposed on a bottom surface of the PET film. Refractive indices of the base layer and the one or more removable lens layers may be matched to within 0.2.

370 nm transmission of the protective lens stack may be less than 5%. Transmission of the protective lens stack at wavelengths of 320-380 nm may be less than 5%.

The UV blocking additive may comprise a hindered amine light stabilizer (HALS).

The UV blocking additive may comprise a UV absorber. The UV absorber may be selected from the group consisting of carbon black, rutile titanium oxide, hydroxy benzophenone, and benzophenone.

The UV blocking additive may comprise a quencher.

The PET film of the base layer may have a thickness of 4 mil to 20 mil, preferably 7 to 8 mil (e.g. 7.5 mil).

The PET film of each of the one or more removable lens layers may have a thickness of 1 to 4 mil, preferably 2 mil.

The base layer may include a second adhesive disposed on a bottom surface of the PET film containing the UV blocking additive, the second adhesive having a pull strength greater than that of the first adhesive. The PET film of the base layer may have a thickness of 2 mil to 7 mil, preferably 3 to 4 mil. The PET film of each of the one or more removable lens layers may have a thickness of 2 to 7 mil, preferably 3 to 4 mil.

A total haze of the protective lens stack may be 2% or less (e.g. 1%). A visible light transmission (VLT) of the protective lens stack may be 87% or greater (e.g. 90%).

Another aspect of the embodiments of the present disclosure is a face shield. The face shield may comprise a base layer including a polyethylene terephthalate (PET) film having a thickness of 4 mil to 20 mil and containing a UV blocking additive. The face shield may further comprise one or more removable lens layers stacked on top of the base layer, each of the removable lens layers including a PET film having a thickness of 1 to 4 mil and an adhesive disposed on a bottom surface of the PET film. Refractive indices of the base layer and the one or more removable lens layers may be matched to within 0.2.

Another aspect of the embodiments of the present disclosure is a surface mountable protective lens stack. The surface mountable protective lens stack may comprise a base layer including a polyethylene terephthalate (PET) film having a thickness of 2 mil to 7 mil and containing a UV blocking additive. The surface mountable protective lens stack may further comprise one or more removable lens layers stacked on top of the base layer, each of the removable lens layers including a PET film having a thickness of 2 to 7 mil and a first adhesive disposed on a bottom surface of the PET film. The base layer may further include a second adhesive disposed on a bottom surface of the PET film containing the UV blocking additive, the second adhesive having a pull strength greater than that of the first adhesive. Refractive indices of the base layer and the one or more removable lens layers may be matched to within 0.2.

Another aspect of the embodiments of the present disclosure is a protective lens stack. The protective lens stack may comprise a base layer including a polyethylene terephthalate (PET) film containing a UV blocking additive, the base layer having less than 0.5% haze. The protective lens stack may further comprise one or more removable lens layers stacked on top of the base layer, each of the removable lens layers having less than 0.5% haze and including a PET film and a first adhesive disposed on a bottom surface of the PET film.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
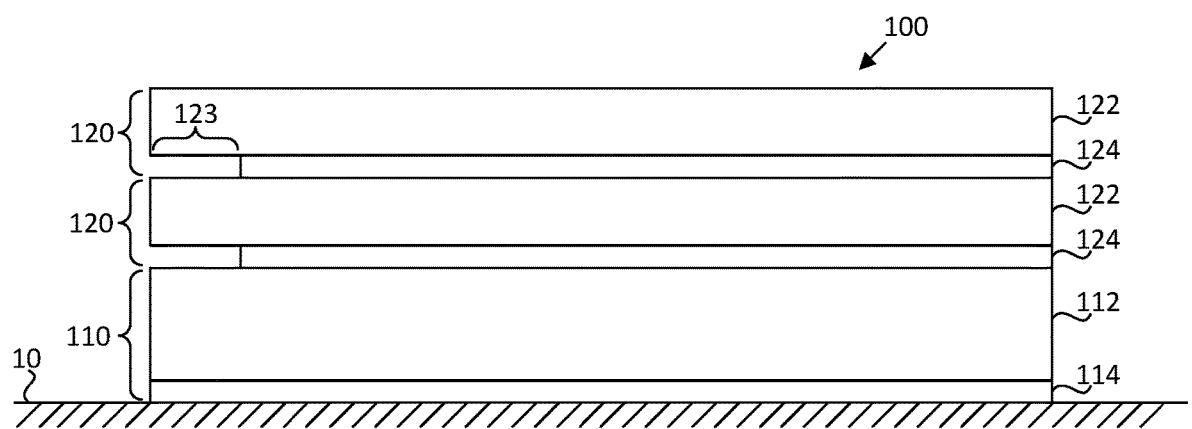
FIG. 1 is a cross-sectional view of a protective lens stack according to an embodiment of the present disclosure.

The present disclosure encompasses various embodiments of an optical stack of laminated removable protective lenses with a low haze integrated UV absorbing packaging for using as a protective face shield or affixing to a window (e.g. of a surgical helmet, hood, or gown worn in an operating room). The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

FIG. 1 is a cross-sectional view of a protective lens stack 100 according to an embodiment of the present disclosure. The protective lens stack 100 may be affixed to a surface 10 as shown or may stand alone as a face shield, which may be attached at a perimeter thereof to a frame, for example. The surface 10 may be a transparent window of a surgical helmet, hood, or gown as may be worn by a surgical team member in an operating room. In the case of a protective lens stack 100 used as a standalone face shield without being mounted to a surface 10, the face shield may be of an open type that is worn in front of and only partially encloses the face. Alternatively, the face shield may be of a closed type such as a visor of a helmet or other article that fully encloses the wearer's face and head.

In either case, the protective lens stack 100 may combine low haze, UV blocking, and stability under multiple sterilization processes, all while providing one or more removable lens layers that may be torn off by the wearer as they become soiled. To this end, the protective lens stack 100 may comprise a base layer 110 including a polyethylene terephthalate (PET) film 112 containing a UV blocking additive and one or more removable lens layers 120 stacked on top of the base layer 110. By incorporating the UV blocking additive into the PET film 112 of the base layer 110, the desired UV blocking capability can be achieved without the need to include a separate UV blocking film or permanent adhesive layer therebetween. By eliminating these two layers, the total haze of the protective lens stack 100 may be reduced by 1%, amounting to a 50% increase in clarity over the conventional construction. Each layer of the resulting protective lens stack 100, including the base layer 110 and each of the removable lens layer(s) 120, may have less than 0.5% haze.

Each of the removable lens layers 120 may include a PET film 122 and an adhesive 124 disposed on a bottom surface of the PET film 122. The PET film 122 of the removable lens layer(s) 120 need not include the UV blocking additive since the removable lens layer(s) 120 are intended as sacrificial layers that can be removed as they become soiled. The adhesive 124 may be a dry mount adhesive such as a polymethyl methacrylate (PMMA) adhesive as described in U.S. Pat. No. 9,295,297, entitled "Adhesive Mountable Stack of Removable Layers," a wet mount adhesive as described in U.S. Pat. No. 9,128,545, entitled "Touch Screen Shield," or an adhesive as described in U.S. Pat. No. 6,536,045, entitled "Tear-off Optical Stack Having Peripheral Seal Mount," the entire contents of each of which is expressly incorporated by reference herein. The adhesive 124 may be a pressure sensitive adhesive (PSA).

In the example of FIG. 1, two removable lens layers 120 are shown: a first removable lens layer 120 stacked on top of the base layer 110 and a second removable lens layer 120 stacked on top of the first removable lens layer 120. The adhesive 124 of the first removable lens layer 120 adheres the PET film 122 of the first removable lens layer 120 to the PET film 112 of the base layer 110. The adhesive 124 of the second removable lens layer 120 adheres the PET film 122 of the second removable lens layer 120 to the PET film 122 of the first removable lens layer 120. In this way, a stack of removable lens layers 120 may be assembled, each one after the first being adhered to the PET film 122 of the preceding removable lens layer 120.

When the outermost PET film 122 becomes soiled (e.g. with blood in an operating room setting), the wearer of the protective lens stack 100 may simply tear off the outermost removable lens layer 120 to reveal a clear lens layer 120 or the base layer 110 underneath. The adhesive 124 of each removable lens layer 120 may remain with the PET film 122 of the same removable lens layer 120 as the layer 120 is removed. That is, the adhesive 124 may be removable from the PET film 122 of the preceding lens layer 120 without leaving a significant amount of residue (e.g. with adhesive transfer 1% or less). So that it is easier to tear off the removable lens layer(s) 120, each removable PET film 122 may have an adhesive-free region 123 or "dry lane" at a periphery thereof where the adhesive 124 is not applied. For example, in the case of a 10-inch-wide protective lens stack 100 (having one or more 10-inch-wide removable PET films 122), the adhesive-free region 123 of each removable PET film 122 may be less than one-third of the width of the PET film 122, e.g., 3.2 inches. In the illustrated example, the adhesive-free region 123 is on only one side of the PET film 122, but it is contemplated that the adhesive-free region 123 may be provided on both sides depending on the preferred technique for tearing off the removable lens layer(s) 120 (e.g. with left hand only, with right hand only, or with either hand).

In order to ensure high visual acuity through the protective lens stack 100, internal reflections within the protective lens stack 100 may be minimized by matching the indices of refraction of each layer 110, 120. In this regard, the PET films 112, 122 and adhesive layers 124 making up the layers 110, 120 may be produced or selected so as to have the same or very similar indices of refraction as described in U.S. Pat. No. 9,295,297, incorporated by reference above. In particular, refractive indices of the base layer 110 and the one or more removable lens layers 120 may be matched to within 0.2.

The UV blocking additive that is incorporated into the PET film 112 of the base layer 110 may take a variety of forms. Most preferably, the UV blocking additive may comprise a hindered amine light stabilizer (HALS), which is a long-term thermal stabilizer that traps free radicals formed during photo-oxidation of plastics. The HALS may be optically clear and may be produced or selected to be refractive index matched to the PET film 112 or, in general, such that the refractive indices of the base layer 110 containing the HALS and the one or more removable lens layers 120 are within 0.2.

Other examples of the UV blocking additive that may be incorporated into the PET film 112 of the base layer 110 instead of or in combination with HALS are UV absorbers and quenchers. UV absorbers may include carbon black, rutile titanium oxide, hydroxy benzophenone, and benzophenones, for example. However, carbon black may have the negative effect of adding haze, while the other UV absorbers are either not optimized for thin PET films or insufficiently block UV radiation (e.g. rutile titanium oxide may not block UVB below 315 nm). Quenchers containing heavy metals may provide limited UV blocking capability to the PET film 112 (not as effective as HALS), but have the negative property of adding unwanted color to the resulting protective lens stack 100. In any case, the refractive index of the UV blocking additive may be matched with that of the PET film 112 and the remainder of the protective lens stack 100 (e.g. to within 0.2).

Owing to the incorporation of the UV blocking additive (HALS, UV absorber, and/or quencher) into the PET film 112 of the base layer 110, UV rays can be blocked by the protective lens stack 100. In particular, the resulting 370 nm transmission of the protective lens stack may be less than 5%. More preferably, the resulting transmission of the protective lens stack 100 at wavelengths of 320-380 nm may be less than 5%. Moreover, since the UV blocking additive is polymer-bound in the PET film 112, it cannot migrate from the PET film 112 during sterilization processes such as gamma irradiation and ethylene oxide (EO) sterilization. Therefore, the protective lens stack 100 may be used in an operating room setting and undergo the typical sterilization processes without degradation.

The characteristics of the PET film 112 containing the UV blocking additive may be within the ranges shown in Table 1, below.

TABLE 1

| Characteristic | Unit | Range | Test Method |
| --- | --- | --- | --- |
| Tensile Strength MD (machine direction) | Kpsi | 17.0 to 35.0 | ASTM D882 |
| Tensile Strength TD (transverse direction) | Kpsi | 20.0 to 40.0 | ASTM D882 |
| Elongation at Break MD | % | 150.0 to 350.0 | ASTM D882 |
| Elongation at Break TD | % | 100.0 to 300.0 | ASTM D882 |
| Light Transmittance | % | 87.0 to 94.0 | ASTM D1003 |
| Haze | % | 0.20 to 1.5 | ASTM D1003 |
| Gloss (in) | | 165 to 205 | ASTM D523 |
| Gloss (out) | | 165 to 205 | ASTM D523 |
| Friction Coefficient, s | | 0.30 to 0.75 | ASTM D1894 |
| Friction Coefficient, k | | 0.25 to 0.70 | ASTM D1894 |
| Surface Tension (in) | Dyne/cm | 30 to 40 | ASTM D2578 |
| Surface Tension (out) | Dyne/cm | 30 to 40 | ASTM D2578 |
| Color L | | 94 to 98 | ASTM E1347 |
| Color a | | −0.3 to 0.1 | ASTM E1347 |
| Color b | | −0.40 to 0.8 | ASTM E1347 |
| UV Transmittance (370 nm) | % | 0 to 4 | ISO 9050 |

When it is to be used as a standalone face shield (i.e. without being mounted to a surface 10), the protective lens stack 100 may have the following specifications. The PET film 112 of the base layer 110 may have a thickness of 4 mil to 20 mil, preferably 7 to 8 mil (e.g. 7.5 mil). The PET film 122 of each of the one or more removable lens layers 120 may have a thickness of 1 to 4 mil (e.g. 2 mil). In one example construction, two removable lens layers 120, each comprising a 2 mil PET film 122 and an adhesive 124, may be stacked on top of a 7.5 mil index matched UV blocking PET film 112 serving as the base layer 110. In the resulting protective lens 100, haze may be 1% and visible light transmission (VLT) may be 90%. The base layer 110 and the two removable lens layers 120 may each have less than 0.5% haze.

When the protective lens stack 100 is to be surface mountable (e.g. to the surface 10 shown in FIG. 1), the base layer 110 may further include an adhesive 114 disposed on a bottom surface of the PET film 112. The adhesive 114 may have a pull strength greater than that of the adhesive 124 of the removable lens layer(s) 120. As such, the wearer of the protective lens stack 100 can easily remove one of the removable lens layer(s) 120 without accidentally removing the entire protective lens stack 100 from the surface 10. Examples of such an adhesive 114 may be found in U.S. Pat. Nos. 9,295,297 and 6,536,045, incorporated by reference above. The adhesive 114 may be produced or selected such that the refractive indices of the base layer 110 and the one or more removable lens layers 120 remain matched to within 0.2.

As noted above, the surface 10 may be an existing window of a surgical helmet, hood, or gown. It is also contemplated that the surface 10 may more generally be any kind of window. In particular, the surface 10 that the protective lens stack 100 is affixed to may be a windshield of a car or other vehicle, such that the removable lens layers 120 may be peeled off as the windshield becomes soiled with mud and other debris. In this regard, the protective lens stack 100 may be used together with the systems and methods described in Applicant's U.S. Patent Application Pub. No. 2020/0247102, entitled "Thermoform Windshield Stack with Integrated Formable Mold," and U.S. patent application Ser. No. 16/866,392, filed May 4, 2020 and entitled "Protective Barrier for Safety Glazing," the entire contents of each of which is expressly incorporated by reference herein. In its surface mountable form as used on a windshield, the protective lens stack 100 may have the following specifications: The PET film 112 of the base layer 110 may have a thickness of 2 mil to 7 mil, preferably 3 to 4 mil. The PET film 122 of each of the one or more removable lens layers 120 may have a thickness of 2 to 7 mil (e.g. 3 to 4 mil). In the resulting protective lens 100, haze may be 2% and visible light transmission (VLT) may be 70%.

In the illustrated example, a 3-ply protective lens stack 100 is shown, having two removable lens layers 120 in addition to the base layer 110. However, it should be noted that the disclosure is not intended to be limited in this regard and that the inclusion of additional removable lens layers 120, or alternatively a construction having only a single removable lens layer 120, is also contemplated.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A protective lens stack comprising:
   a base layer including a polyethylene terephthalate (PET) film having a thickness of 7 to 8 mil and containing a UV blocking additive; and
   one or more removable lens layers stacked on top of the base layer, each of the removable lens layers including a PET film having a thickness of 1 to 4 mil and a first adhesive disposed on a bottom surface of the PET film,
   wherein refractive indices of the base layer and the one or more removable lens layers are matched to within 0.2, and a 320 nm transmission of the protective lens stack is less than 5%.

2. The protective lens stack of claim 1, wherein transmission of the protective lens stack at wavelengths of 320-380 nm is less than 5%.

3. The protective lens stack of claim 1, wherein the UV blocking additive comprises a hindered amine light stabilizer (HALS).

4. The protective lens stack of claim 1, wherein the UV blocking additive comprises a UV absorber.

5. The protective lens stack of claim 4, wherein the UV absorber is selected from the group consisting of carbon black, rutile titanium oxide, hydroxy benzophenone, and benzophenone.

6. The protective lens stack of claim 1, wherein the UV blocking additive comprises a quencher.

7. The protective lens stack of claim 1, wherein the thickness of the PET film of the base layer is 7.5 mil.

8. The protective lens stack of claim 1, wherein the thickness of the PET film of each of the one or more removable lens layers is 2 mil.

9. The protective lens stack of claim 1, wherein the base layer further includes a second adhesive disposed on a bottom surface of the PET film containing the UV blocking additive, the second adhesive having a pull strength greater than that of the first adhesive.

10. The protective lens stack of claim 1, wherein a total haze of the protective lens stack is 2% or less.

11. The protective lens stack of claim 10, wherein the total haze of the protective lens stack is 1%.

12. A single-use face shield to be worn by operating personnel in a medical operating room comprising:
    a base layer including a polyethylene terephthalate (PET) film having a thickness of 7 to 8 mil and containing a UV blocking additive to protect the operating personnel's face and eyes from lighting in the medical operating room; and
    one or more removable lens layers stacked on top of the base layer, each of the removable lens layers including a PET film having a thickness of 1 to 4 mil and an adhesive disposed on a bottom surface of the PET film,
    wherein refractive indices of the base layer and the one or more removable lens layers are matched to within 0.2, and a 320 nm transmission of the face shield is less than 5%.

13. A surface mountable protective lens stack comprising:
    a base layer including a polyethylene terephthalate (PET) film having a thickness of 7 to 8 mil and containing a UV blocking additive;
    one or more removable lens layers stacked on top of the base layer, each of the removable lens layers including a PET film having a thickness of 1 to 4 mil and a first adhesive disposed on a bottom surface of the PET film,
    wherein the base layer further includes a second adhesive disposed on a bottom surface of the PET film containing the UV blocking additive, the second adhesive having a pull strength greater than that of the first adhesive,
    wherein refractive indices of the base layer and the one or more removable lens layers are matched to within 0.2, a total haze of the protective lens stack is 2% or less, a 320 nm transmission of the protective lens stack is less than 5%, and a visible light transmission (VLT) of the protective lens stack is 87% or greater.

* * * * *